(12) United States Patent
Lee

(10) Patent No.: US 11,243,414 B1
(45) Date of Patent: Feb. 8, 2022

(54) ACCOMMODATIVE DISTANCE CONTROL SYSTEM FOR OPHTHALMIC DEVICES

(71) Applicant: Verily Life Sciences LLC, South San Francisco, CA (US)

(72) Inventor: Shungneng Lee, Sunnyvale, CA (US)

(73) Assignee: Verily Life Sciences LLC, South San Francisco, CA (US)

(*) Notice: Subject to any disclaimer, the term of this patent is extended or adjusted under 35 U.S.C. 154(b) by 281 days.

(21) Appl. No.: 16/280,362

(22) Filed: Feb. 20, 2019

Related U.S. Application Data

(60) Provisional application No. 62/632,797, filed on Feb. 20, 2018.

(51) Int. Cl.
*G02B 7/02* (2021.01)
*G01S 17/08* (2006.01)
*G02C 7/08* (2006.01)
*H04B 1/04* (2006.01)

(52) U.S. Cl.
CPC ............... *G02C 7/083* (2013.01); *H04B 1/04* (2013.01); *G01S 17/08* (2013.01)

(58) Field of Classification Search
CPC . G02C 7/02; G02C 7/04; G02C 7/022; G02C 7/041; G02C 7/049; G02C 2202/20; G02C 7/083; G02B 27/01; G02B 27/0172; G02B 27/0176; G01S 17/08; G01S 17/06; G01S 17/88; H04B 1/04; H04B 1/02; H04B 1/03; H04B 1/0343; H04B 1/0346; H04B 1/034
USPC .............. 351/159.01, 159.39, 159.52, 159.3, 351/159.74, 159.76
See application file for complete search history.

(56) References Cited

U.S. PATENT DOCUMENTS

| | | | |
|---|---|---|---|
| 8,778,022 B2 | 7/2014 | Blum et al. | |
| 9,124,796 B2 | 9/2015 | Blum et al. | |
| 9,259,309 B2 | 2/2016 | Fehr et al. | |
| 2012/0245444 A1 | 9/2012 | Otis et al. | |
| 2014/0327875 A1 | 11/2014 | Blum et al. | |
| 2019/0212821 A1* | 7/2019 | Keller | G06F 3/014 |

* cited by examiner

*Primary Examiner* — Jie Lei
(74) *Attorney, Agent, or Firm* — Christensen O'Connor Johnson Kindness PLLC

(57) ABSTRACT

An accommodation remote control includes a housing adapted for wearing on an upper extremity of a user, a range-finding sensor, a wireless transmitter, and a controller. The controller causes the accommodation remote control to perform operations including: emitting a range finding signal from the range-finding sensor to measure a distance between the accommodation remote control and a body part of the user, determining an accommodation value for an ophthalmic device based upon the distance measured with the range-finding sensor, and transmitting an accommodation control signal from the wireless transmitter to adjust an optical power of the ophthalmic device. The accommodation control signal is based upon the accommodation value.

12 Claims, 4 Drawing Sheets

ACCOMMODATIVE DISTANCE CONTROL SYSTEM FOR OPHTHALMIC DEVICES

CROSS-REFERENCE TO RELATED APPLICATION

This application claims the benefit of U.S. Application No. 62/632,797, filed on Feb. 20, 2018, the contents of which are incorporated herein by reference.

TECHNICAL FIELD

This disclosure relates generally to ophthalmic devices, and in particular but not exclusively, relates to accommodative ophthalmic devices

BACKGROUND INFORMATION

Accommodation is a process by which the eye adjusts its focal distance to maintain focus on objects of varying distance. Accommodation is a reflex action, but can be consciously manipulated. Accommodation is controlled by contractions of the ciliary muscle. The ciliary muscle encircles the eye's elastic lens and applies a force on the elastic lens during muscle contractions that change the focal point of the elastic lens.

As an individual ages, the effectiveness of the ciliary muscle degrades due to hardening of the lens. Presbyopia is a progressive age-related loss of accommodative or focusing strength of the eye, which results in increased blur at near distances. This loss of accommodative strength with age has been well studied and is relatively consistent and predictable. Presbyopia affects nearly 1.7 billion people worldwide today (110 million in the United States alone) and that number is expected to substantially rise as the world's population ages. Techniques and devices that can help individuals offset the effects of Presbyopia are increasingly in demand.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
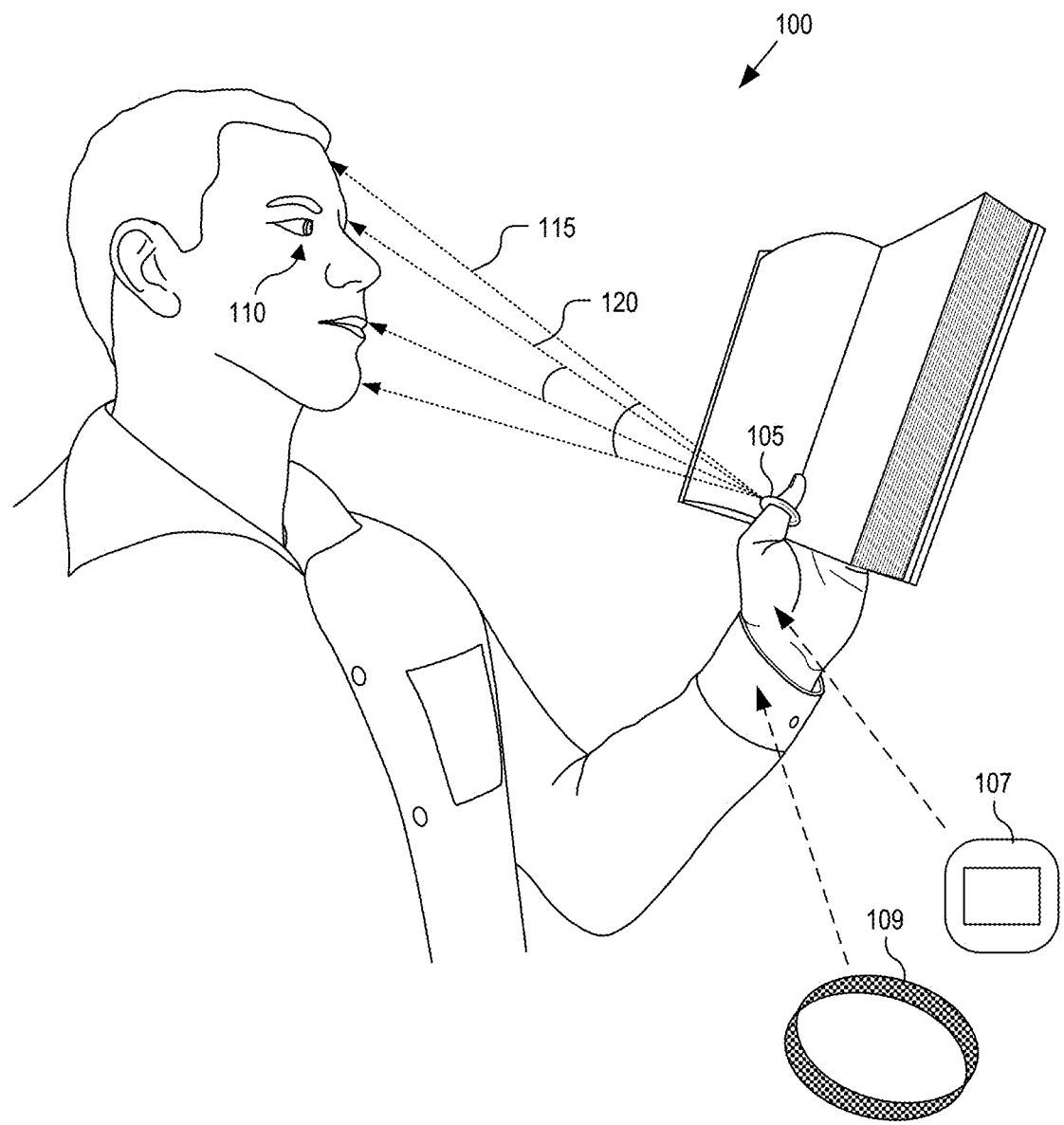
FIG. 1 illustrates the use of an accommodation remote control, having multiple possible form factors, to control the optical power of an ophthalmic device, in accordance with an embodiment of the disclosure.

Embodiments of an apparatus, system and method of operation for an accommodation remote control that adjusts or otherwise controls the accommodation of an ophthalmic device having variable accommodative optical power are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Variable power ophthalmic devices that offset the effects of Presbyopia or other ocular diseases are being developed. Such ophthalmic devices include variable power intraocular lenses (IOLs), variable power contact lenses, variable power glasses/visor/head wearable display, etc. The variable optical power provided by the active optic of these ophthalmic devices help a user with diminished capacity to adjust their focus (i.e., accommodate) and bring objects of variable focal depth into focus. Determining how much accommodation a user needs for a given activity and therefore how much to adjust the variable power of the active optic is a challenge.

Candidates for solving this accommodation control problem include (1) directly sensing the electrical signals of the ciliary muscle using electromyography techniques, (2) gaze direction or convergence sensing, and (3) sensing the mechanical reflexes/deformation of the ciliary muscle or capsular sack. However, these solutions tend to be complex, and in some cases invasive.

The techniques disclosed herein provide a solution with an intuitive user experience that automatically determines the amount of accommodation needed by the user while performing activities that engage the user's upper extremities (e.g., wrist, hand, fingers) for a given activity (e.g., reading). An accommodation remote control is worn by the user on the upper extremity and acquires real-time measurements of focal distance between the user's upper extremity and face. These measurements are used to compute an accommodation value that is wirelessly conveyed to an ophthalmic device worn or used by the user to provide real-time adjustments to the accommodation provided by the active optic of the ophthalmic device.

FIG. 1 illustrates the use of an accommodation control system 100 including an accommodation remote control 105 for controlling the optical power of an ophthalmic device 110 (e.g., contact lens or IOL), in accordance with an embodiment of the disclosure. The illustrated embodiment of accommodation remote control 105 is a ring worn on the user's thumb; however, it should be appreciated that other form factors may also be implemented, such as a patch 107 having an adhesive backing for sticking to the user's skin proximate to their hand or wrist, or a strap or band 109 that is worn around the user's wrist. Similarly, although FIG. 1 illustrates ophthalmic device 110 as a contact lens or IOL, other form factors including glasses, visors, head wearable displays or otherwise may be used in connection with the accommodation remote control described herein.

During operation, accommodation remote control 105 emits a range finding signal 115 towards a body part of the user, such as the face. Range finding signal 115 may be an optical signal (e.g., pulsed laser light), an acoustical signal (e.g., ultrasound or sonar), or other electromagnetic waves for measuring distance. A reflection of the range finding signal is measured by accommodation remote control 105 to determine a distance between the body part (e.g., face) and accommodation remote control 105. Based upon this measured distance, accommodation remote control 105 computes an accommodation value that is associated with the measured distance and wirelessly transmits an accommodation control signal 120 to ophthalmic device 110 providing real-time feedback control of the variable power of ophthalmic device 110. In one embodiment, accommodation control signal 120 is an optical signal (e.g., infrared beam), though other electromagnetic frequencies may be used (e.g., radio frequencies).

Accommodation control system 100 provides an intuitive user experience for controlling accommodation. This technique recognizes that most activities requiring near field vision engage the hands. If something is close enough such that a user requires accommodation, it is usually intuitive or simple enough that the user brings one of their hands into their field of view (FOV). Based upon this observation, accommodation control system 100 uses a wearable accommodation remote control 105 worn on or near the user's hands for measuring a focal distance and transmitting accommodation control signals 120 for selecting a desired amount of accommodative power provided by ophthalmic device 110. In one embodiment, the communication link between accommodation remote control 105 and ophthalmic device 110 is unidirectional with accommodation remote control 105 transmitting and ophthalmic device 110 receiving.

Figure 2A:
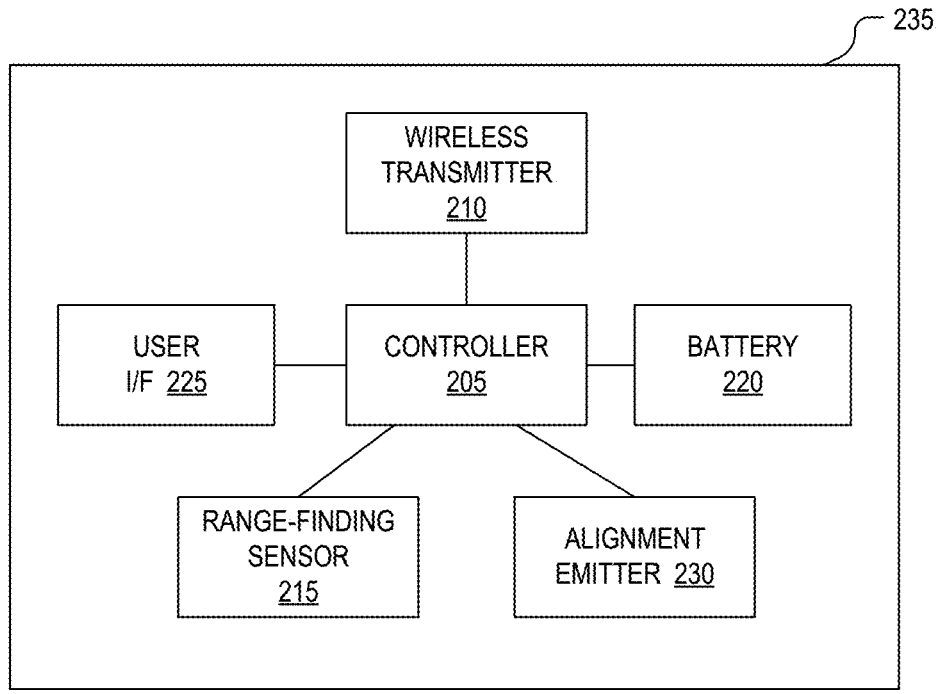
FIG. 2A is a functional block diagram illustrating components of an accommodation remote control, in accordance with an embodiment of the disclosure.

FIG. 2A is a functional block diagram illustrating components of an accommodation remote control 200, in accordance with an embodiment of the disclosure. Accommodation remote control 200 is one possible implementation of accommodation remote controls 105, 107, or 109. The illustrated embodiment of accommodation remote control 200 includes a controller 205, a wireless transmitter 210, a range-finding sensor 215, a battery 220, a user interface 225, an alignment emitter 230, and a housing 235. Not all illustrated components may be included in various implementations of accommodation remote control 200. For example, alignment emitter 230 and/or user interface 225 may be optional components.

During operation, range-finding sensor 215 emits a range finding signal for measuring the distance between accommodation remote control 200 and a body part (e.g., face) of the user. In one embodiment, range-finding sensors 215 is positioned and oriented on housing 235 to emit the range finding signal towards the user's face when accommodation remote control 200 is worn on the user's upper extremity and the upper extremity is moved into a FOV of the user. Range-finding sensor 215 may be implemented as an optical range finder (e.g., emits a focused beam of infrared light), an acoustical range finder (e.g., ultrasound sensor), or other electromagnetic range finding sensors (e.g., millimeter wave range finder). In one embodiment, range-finding sensor 215 emits the range finding signal as a focused beam so as to limit the measured distance to just the user's face or eyes.

In the illustrated embodiment, alignment emitter 230 is further included to aid with aligning range-finding sensor 215 towards the user's face or eyes. For example, alignment emitter 230 may be configured to emit a focused alignment beam of visible light. Alignment emitter 230 is disposed in or on housing 235 and aligned relative to range-finding sensor 215 such that range-finding sensor 215 is pointed at the user's face when the user can see the alignment beam output from alignment emitter 230. Alignment emitter 230 may be useful for embodiments where user interface 225 includes a manual control that enables the user to trigger a focal distance measurement for accommodation. In one embodiment, alignment emitter 230 is implemented with a photodiode adapted to emit a visible beam of lighted within a defined emission cone.

Wireless transmitter 210 is included with accommodation remote control 200 to convey an accommodation control signal to ophthalmic device 110 for remotely manipulating an active optic disposed within ophthalmic device 110. Wireless transmitter 210 may by a variety of different electromagnetic transmitters. For example, in one embodiment, wireless transmitter 210 is a radio frequency transmitter. In yet another embodiment, wireless transmitter 210 is an optical transmitter (e.g., infrared transmitter).

Wireless transmitter 210 may be adapted to emit the accommodation control signal as a broad angle emission or have a confined emission path that is focused within a narrow communication emission cone. In one embodiment, wireless transmitter 210 and range-finding sensor 215 confine and align their emission cones relative to each other such that the accommodation control signal only reaches ophthalmic device 110, thereby adjusting its accommodation setting, when range-finding sensor 215 is aligned with the user's face. In other words, the ranging emission cone in which the range finding signal is confined is aligned relative to the communication emission cone such that the distance measured is measured to the face when the communication emission cone is aligned with an eye of the user.

User interface 225 may be disposed on housing 235 to provide one or more manual controls for manipulating functionality of accommodation remote control 200. For example, user interface 225 may include a button, dial, or other input type that enables the user to manually request an increase or decrease in the accommodating power of ophthalmic device 110. In various embodiments, user interface 225 may include a button or other input type to request locking or unlocking of the accommodating power of ophthalmic device 110. In various embodiments, user interface 225 may also include a button or other input type for triggering emission of the range finding signal and measurement of the focal distance for accommodation. A manual control for triggering an accommodation measurement may be used in connection with alignment emitter 230. For example, the user may look at accommodation remote control 200, press the manual control for triggering an accommodation measurement, and ensure that he/she sees the alignment beam as confirmation that range-finding sensor 215 was aligned with the user's face when triggering the accommodation measurement. Of course, other user experience routines for triggering the range finding signal and alignment emitter 230 may be implemented.

In some embodiments, accommodation remote control 200 includes a plurality of range finding sensors oriented to emit range finding signals in multiple directions and a plurality of wireless transmitters 210 aligned with a corresponding one of the range finding sensors. For example, a plurality of paired range finding sensors and wireless transmitters may encircle the perimeter of housing 235 and only the sensor/transmitter pair that is aligned with the user's face and ophthalmic device 110 will control accommodation at a given time.

Controller 205 is included in or on housing 235 and coupled to control and orchestrate the operation of the other components, as described herein. Controller 205 may include software/firmware logic stored on a memory and executed by a microprocessor, hardware logic (e.g., application specific integrated circuit, field programmable gate array, etc.), or a combination of both. Controller 205 along with the other function components of accommodation remote control 200 are powered by battery 220 which is also disposed within housing 235. Battery 220 may be rechargeable, replaceable, one time use, or otherwise.

As mentioned above in connection with FIG. 1, housing 235 of accommodation remote control 200 may assume a variety of different form factors including a ring, a skin patch, a wristband, etc. as long as it is adapted for wearing on the user's upper extremity (e.g., near the hand, wrist, fingers, or thumb).

Figure 2B:
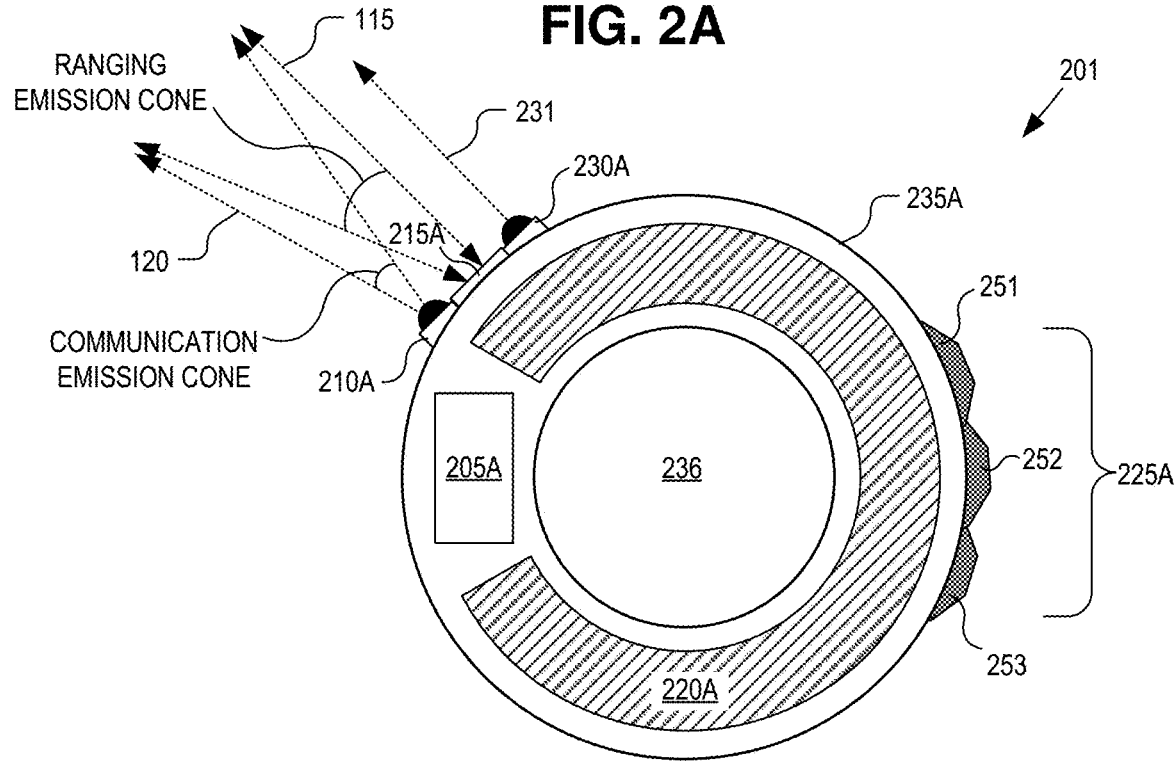
FIG. 2B illustrates a ring implementation of an accommodation remote control, in accordance with an embodiment of the disclosure.

FIG. 2B is a cross-sectional illustration of an accommodation remote control 201 having a ring form factor, in accordance with an embodiment of the disclosure. Accommodation remote control 201 is one possible implementation of accommodation remote control 200 or 105. The illustrated embodiment of accommodation remote control 201 includes controller 205A, wireless transmitter 210A, range-finding sensor 215A, battery 220A, user interface 225A, alignment emitter 230A, and ring shaped housing 235A.

As illustrated, housing 235A includes a hole 236 sized for wearing accommodation remote control 201 on a finger or thumb (i.e., digit). User interface 225A, wireless transmitter 210A, range-finding sensor 215A, and alignment emitter 230A are positioned along a perimeter of the ring shaped housing 235A. Wireless transmitter 210A, range-finding sensor 215A, and alignment emitter 230A are positioned proximate to each other to all face a common direction while user interface 225A is positioned away from those other components. The spacing of wireless transmitter 210A, range-finding sensor 215A, and alignment emitter 230A relative to user interface 225A may be selected such that when a thumb is inserted through hole 235 and the emitting components are directed towards a user's face, the user can reach the manual controls (e.g., buttons 251, 252, and 252) with one or more of their other fingers. Correspondingly, if the user has inserted a finger through hole 236, then user interface 225A may be operated by another finger or the thumb while the emitting components are oriented towards the user's face. During reading, writing, typing, or other activities that engage one of the hands, the user can wear accommodation remote control 201 on a finger or thumb while performing such activities. During these hand based activities, accommodation remote control 201 can automatically control the accommodative optical power of an ophthalmic device also worn by the user.

The illustrated embodiment of user interface 225A includes three buttons for providing manual control. Buttons 251-253 may be mechanical buttons, capacitive buttons, or otherwise. In one embodiment, button 251 may be pressed to increase optical power, button 253 may be pressed to decrease optical power, and center button 252 may be toggled to lock or unlock automatic accommodation control using a press and hold while a quick press of center button 252 may trigger an accommodation measurement and alignment beam 231. While the illustrated embodiment of user interface 225A includes three buttons 251-253, more or less buttons having a variety of other form factors (sliders, scroll wheels, etc.) and functional assignments may be implemented.

Figure 3:
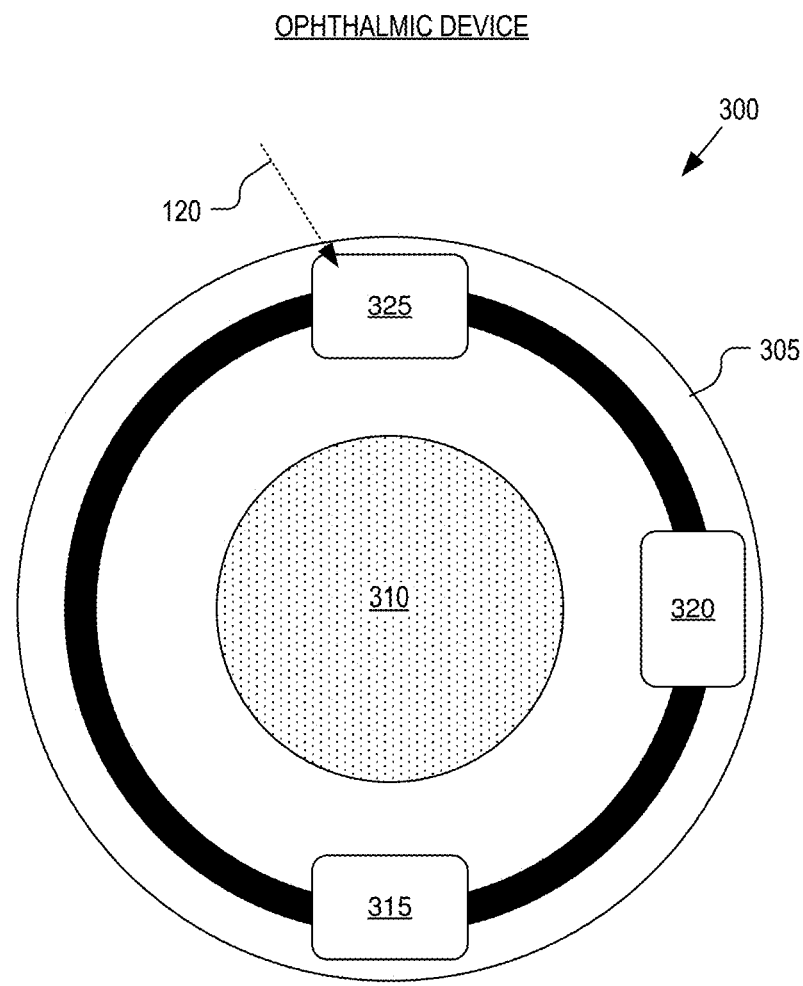
FIG. 3 illustrates a demonstrative ophthalmic device, in accordance with an embodiment of the disclosure.

As mentioned above in connection with FIG. 1, ophthalmic device 110 may assume a variety of different form factors including an IOL, a contact lens, glasses, a visor, a head wearable display, or otherwise. FIG. 3 illustrates a demonstrative ophthalmic device 300, which may be a contact lens or an IOL, in accordance with an embodiment of the disclosure. The illustrated embodiment of ophthalmic device 300 includes an enclosure 305, an active optic 310, a controller 315, a battery 320, and a wireless receiver 325. During operation, controller 315 is configured to receive accommodation control signals 120 via wireless receiver 325 from accommodation remote control 200. Wireless receiver 325 may be an optical receiver, a radio frequency receiver, or otherwise. In response to accommodation control signal 120, controller 315 adjusts the accommodation power of active optic 310. For example, active optic 310 may adjust its diopter setting between 0 and +9. Active optic 310 may be implemented as an electrowetting optic, a refractive liquid crystal optic, a diffractive liquid crystal optic, or otherwise. In the event of failure of accommodation remote control 200, controller 315 may be designed or programmed to default to distance vision as a failsafe.

Figure 4:
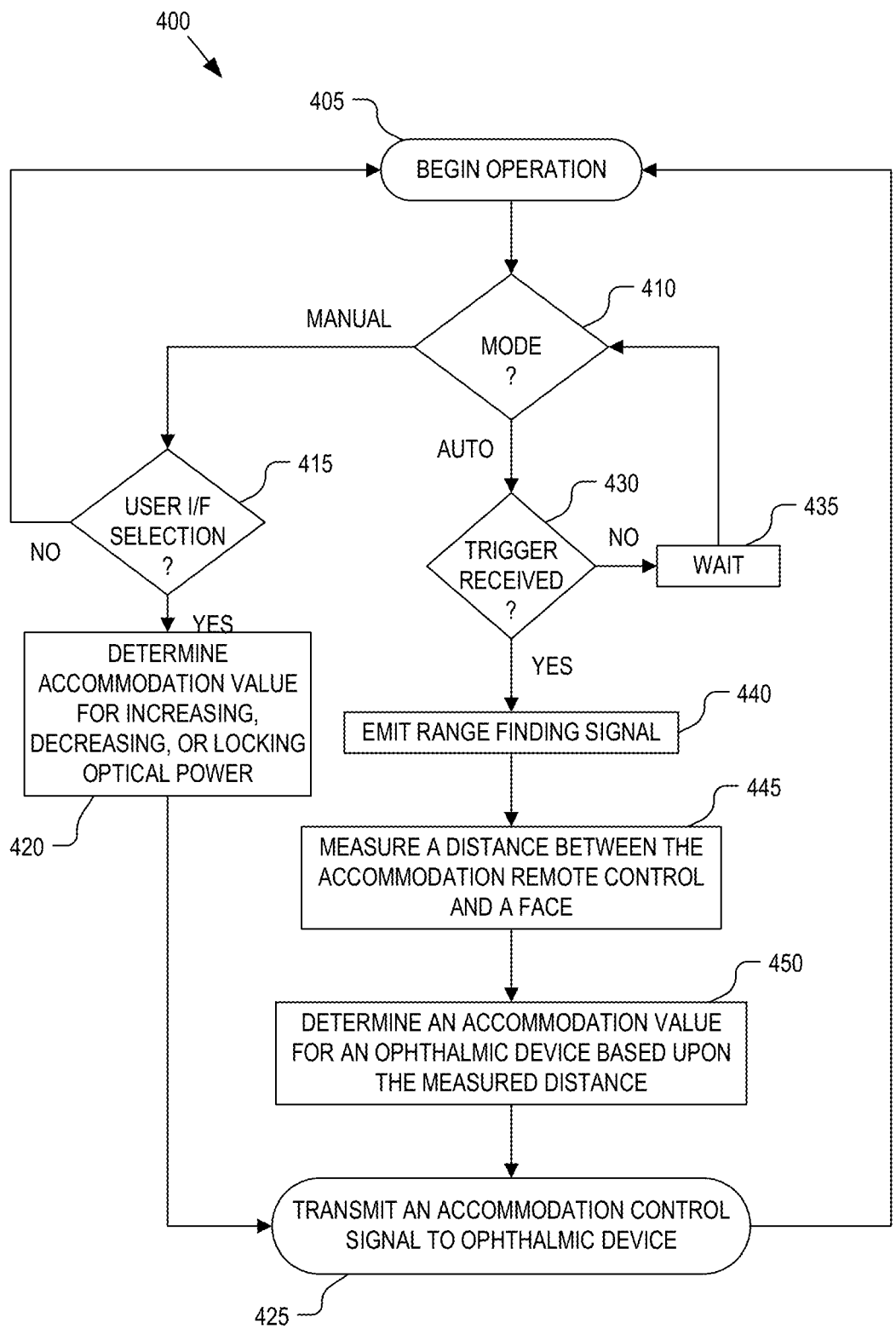
FIG. 4 is a flow chart illustrating operation of an accommodation remote control, in accordance with an embodiment of the disclosure.

FIG. 4 is a flow chart illustrating a process 400 for operation of accommodation remote control 200, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Process 400 begins in a process block 405 when the user is wearing both an ophthalmic device (e.g., ophthalmic device 110) and accommodation remote control 200 with accommodation remote control 200 enabled. Accommodation remote control 200 may be operated in an automatic or manual mode of operation. In one embodiment, accommodation remote control 200 defaults to an automatic mode where accommodation control signals are automatically output to ophthalmic device 110; however, should the user press a button on user interface 225, then the mode of operation enters a manual mode. In other embodiments, a specific button press or sequence of button presses is used to enter the automatic accommodation mode.

In decision block 410, if manual mode is entered (either by default or by user instigation) process 400 continues to a decision bock 415 to determine whether user interface 225 has received a user input. If the user has pressed one of the buttons (e.g., buttons 251, 252, 253) on user interface 225, then accommodation remote control 200 determines the correct accommodation value for implementing the user request. For example, user interface 225 may include manual controls (e.g., buttons 251 and 253) for increasing or decreasing the optical power of ophthalmic device 110 in response to a user selection. In one embodiment, user interface 225 includes a manual control (e.g., long press of button 252) for locking or unlocking the automatic optical power adjustment feature. In one embodiment, user interface 225 includes a manual control (e.g., short press of button 252) for triggering emission of a range finding signal and/or enabling alignment emitter 230. Finally, in a process block 425, an accommodation control signal 120 is transmitted from wireless transmitter 210 to ophthalmic device 110 to trigger the manually requested behavior.

Returning to decision block 410, if accommodation remote control 200 enters automatic accommodation mode (either by default or by user request), then process 400 continues to a decision block 430. At decision block 430, accommodation remote control 200 waits (process block 435) for the user to trigger a range finding routine to measure the accommodation distance (e.g., focal depth) between the user's face and accommodation remote control 200. The user may trigger a measurement by pressing a button (e.g., short press of button 252) on user interface 225. If the user triggers an accommodation measurement, then range finding signal 115 is emitted by range-finding sensor 215 (process block 440). Optionally, triggering an accommodation measurement may also enable alignment beam 231 to aid alignment of range-finding sensor 215 to the user's face. Of course, other routines or control logic for enabling, temporarily enabling, pulsing, or delay pulsing range finding signal 115 after enabling alignment beam 231 may be implemented. In some embodiments, accommodation control is fully automatic and continuous and therefore decision block 430 and process block 435 may be omitted.

Once range finding signal 115 is emitted, range-finding sensor 215 monitors for a reflection of ranging finding signal 115 to measure a distance between accommodation remote control 200 and the user's face (process block 445). Range sensing may execute any of a variety of known ranging sensing techniques, such as measuring a time of flight of range finding signal 115. Based upon a measurement of the reflected ranging finding signal 115, a distance is measured and an accommodation value corresponding to, or based on, that distance is determined (process block 450). Finally, in process block 425, wireless transmitter 210 emits an accommodation control signal 120 to ophthalmic device 110 to manipulate its accommodative optical power. In one embodiment, wireless transmitter 210 has a constrained communication emission cone such that accommodation control signal 120 will only reach the wireless receiver on ophthalmic device 110 when range-finding sensor 215 is aligned with the user's face or eyes. In other words, the ranging emission cone of range-finding sensor 215 is aligned relative to the communication emission cone of wireless transmitter 210 such that the distance measured to the body part within the ranging emission cone is to a face of the user when the communication emission cone is aligned with an eye of the user. By constraining the emission cones of wireless transmitter 210 and range-finding sensor 215, passive alignment is continuously and automatically enforced by design. Distances measured to other body parts are automatically rejected since their corresponding accommodation control signal will not reach ophthalmic device 110. Of course, as mentioned above, express alignment using alignment emitter 230 and user activation a button on user interface 225 may also be used in lieu of the above passive alignment technique, or in combination with the above passive alignment technique.

In some embodiments, the accommodation value calculated by accommodation remote control 201 determines the necessary accommodation the ophthalmic device needs to provide to the user's eye(s) based upon the distance measurements obtained by range-finding sensor 215. In this embodiment, the accommodation control signal transmitted to the ophthalmic device may be used to directly control the optical power of the ophthalmic device. A calibration routine may be executed to configure the system for a given user. However, in other embodiments, the accommodation value calculated by accommodation remote control 201 may just be a distance calculation computed by controller 205 based upon the range-finder signals emitted from range finding sensor 215. In this latter embodiment, the accommodation control signal transmitted to the ophthalmic device may simply include a calculated distance measurement (or value indicative thereof) that the ophthalmic device then uses to compute its own accommodation control signals for adjusting optical power of active optic 310. Of course, in this latter embodiment, the user may still access user interface 225 to send manual control signals (e.g., "power up" or "power down" signals) for manually adjusting the optical power provided by active optic 310.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An accommodation remote control, comprising:
   a housing adapted for wearing on an upper extremity of a user, wherein the upper extremity includes one of a finger, a thumb, a hand, or a wrist of the user;
   a range-finding sensor disposed in or on the housing;
   a wireless transmitter disposed in or on the housing; and
   a controller disposed in or on the housing and coupled to the range-finding sensor and the wireless transmitter, the controller including logic that when executed by the controller causes the accommodation remote control to perform operations including:
   emitting a range finding signal from the range-finding sensor to measure a distance between the accommodation remote control and a body part of the user, wherein the body part includes a face or an eye of the user;
   determining an accommodation value for an ophthalmic device based upon the distance measured with the range-finding sensor, wherein the ophthalmic device is worn in, on, or adjacent to the body part; and
   transmitting an accommodation control signal from the wireless transmitter, wherein the accommodation control signal includes information for controlling an optical power of the ophthalmic device, wherein the accommodation control signal is based upon the accommodation value.

2. The accommodation remote control of claim 1, wherein the housing comprises a ring shaped enclosure having a hole sized to wear on the finger or the thumb.

3. The accommodation remote control of claim 1, wherein the housing comprises an enclosure having one of: an adhesive backing for adhering to skin or an attached strap for wearing around the wrist.

4. The accommodation remote control of claim 1, wherein the range-finding sensor is positioned and oriented on the housing to direct the range finding signal towards the face of the user when the accommodation remote control is worn on the upper extremity and the upper extremity is moved into a field of view of the user.

5. The accommodation remote control of claim 4, further comprising:
an alignment emitter disposed in or on the housing and adapted for emitting an alignment beam having visible light, wherein the range-finding sensor is aligned relative to the alignment emitter such that the distance measured to the body part is measured to the face when the user sees the alignment beam.

6. The accommodation remote control of claim 1, wherein the range-finding sensor is adapted to confine emission of the range finding signal to within a ranging emission cone, the wireless transmitter is adapted to confine emission of the accommodation control signal to within a communication emission cone, and wherein the ranging emission cone is aligned relative to the communication emission cone such that the distance measured to the body part within the ranging emission cone is to the face of the user when the communication emission cone is aligned with an eye of the user.

7. The accommodation remote control of claim 1, wherein the wireless transmitter comprises an optical infrared emitter.

8. The accommodation remote control of claim 1, wherein the range-finding sensor comprises an optical-based sensor or an acoustical-based sensor.

9. The accommodation remote control of claim 1, further comprising a user interface disposed on the housing and including a first manual control for increasing the optical power of the ophthalmic device and a second manual control for decreasing the optical power of the ophthalmic device.

10. The accommodation remote control of claim 9, wherein the housing comprises a ring shaped enclosure having a hole sized to wear on a first digit of a hand, and wherein the user interface is positioned to be reachable by one or more other digits of the hand when the accommodation remote control is worn on the first digit.

11. The accommodation remote control of claim 9, wherein the user interface includes a third manual control for locking or unlocking the optical power of the ophthalmic device.

12. The accommodation remote control of claim 9, wherein the user interface includes a third manual control for triggering emission of the range finding signal.

* * * * *